(No Model.)
C. W. FILKINS.
THILL COUPLING.
No. 560,135. Patented May 12, 1896.
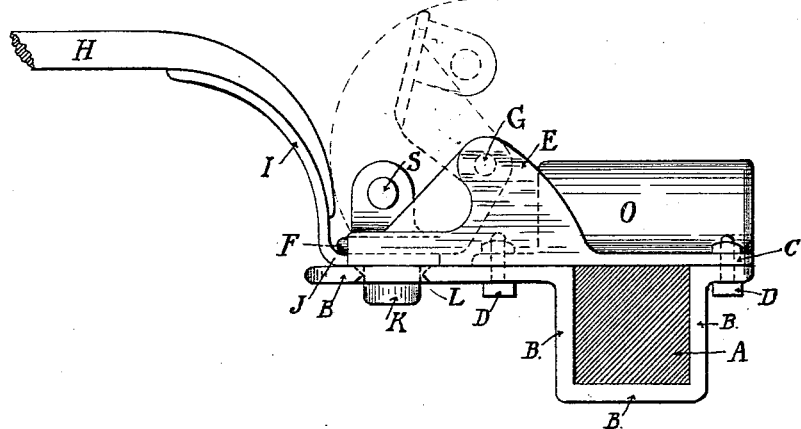
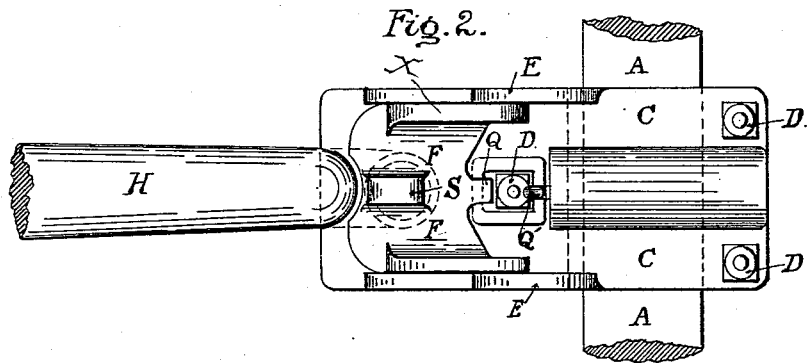
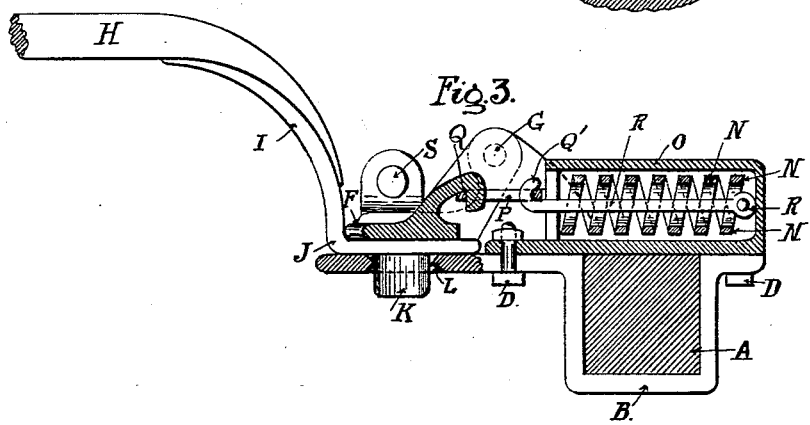
WITNESSES:
J. N. Preston
Don. MacKenzie
INVENTOR
Charles Wesley Filkins
BY John Day
ATTORNEY.

UNITED STATES PATENT OFFICE.

CHARLES WESLEY FILKINS, OF RIVERSIDE, CALIFORNIA.

THILL-COUPLING.

SPECIFICATION forming part of Letters Patent No. 560,135, dated May 12, 1896.

Application filed November 11, 1895. Serial No. 568,584. (No model.)

*To all whom it may concern:*

Be it known that I, CHARLES WESLEY FILKINS, of Riverside, in the county of Riverside and State of California, have invented certain new and useful Improvements in Couplings for Connecting and Attaching Shafts or Poles to Vehicles which Travel upon Streets or Roadways, of which the following is a full, clear, and exact description or specification, reference being had to the annexed sheet of drawings, forming part of the said specification, and to the letters of reference marked thereon.

My said invention, which relates to certain new and useful improvements in couplings for connecting and attaching the shafts or poles to vehicles which travel upon streets or roadways by the traction of horses or other animals, is more specially adapted to that class of vehicles commonly known as "buggies," "broughams," "landaus," and other kinds of carriages for driving in; but it may be also used for other classes of carriages or street-vehicles.

The object of my improvements is to enable the shafts to be quickly removed from the front axle of the vehicle, when necessary, and to be replaced with equal rapidity.

My invention also has for its object to enable the pole, which is used when the vehicle is drawn by a pair or span of horses, to be quickly substituted for the shafts used when driving with a single horse. The terminals with which the shafts or the ends of the cross-tail of the pole are provided have the same kind of connecting-pieces at each end of the cross-tail of the pole, and are of the same distance apart as the connections on the front axle to which the pole or shaft is connected, so that the pole connections enter and fit into the same connections on the front axle that the shaft connections fit into. The connecting mechanism attached to the axle consists of a horizontal plate bolted to a strap which surrounds the under part and the two sides of the axle, whereby they are firmly held thereon. At the sides of this plate two bearings are formed to which a lifting and lowering plate is pivoted by means of pins or bolts, so that this lifting-piece can be raised or lowered radially upon said pivots or pins. The rear part of this lifting-plate is provided with a hook which engages with a ring, connecting it to a horizontal spiral spring contained within a spring-box on the rear part of the plate. The connection of the lifting-plate with the spring is such that the tension of the spring at all times pulls it downward upon the flat head of each connecting-piece upon the shaft or cross-tail of the pole-piece, thereby maintaining the shafts or the pole-pieces in proper connection with that part of the connecting apparatus attached to the front axle of the vehicle.

The attachment connection to the shafts and to the cross-tail of the pole-piece consists of a cylindrical plug. This cylindrical plug enters into and engages with a double countersunk hole in the front part of the under portion of the axle attachment, and when the movable plate hereinbefore referred to is pulled into its downward position by the action of the spiral spring this movable plate, pressing upon that part of the shaft or pole attachment of which the cylindrical plug forms part, maintains the connection between the shafts or pole-pieces and the axle of the carriage or other vehicle.

When it is desired to remove the shafts or pole-pieces from their connections on the front axle of the carriage or other vehicle, the movable plate is pulled upward upon its axis by the insertion of a hook or other equivalent instrument into a hole formed in a piece projecting upward from the top of the front plate, and when the front plate is thus pulled upward the shafts or the pole are instantly removed.

On the annexed sheet of drawings, Figure 1 is a side elevation of my improved attachment constructed in accordance with my present invention. Fig. 2 is a plan of the same, and Fig. 3 is a longitudinal vertical section of the same, showing the construction of the interior part of the spring-box and other details.

In all of the figures, the front axle is marked A. Surrounding the lower part and the two vertical sides of the axle A is the strap B, and to this is attached the upper part of the connecting apparatus, which rests upon the upper flat face of the strap B and the upper face of the axle A.

That part of the connection mechanism which is attached to the strap B consists of the flat portion C, which is fastened to the strap B by means of the bolts and nuts D, as shown. On the forward part of the plate C there are carried the two upwardly-projecting pieces E, which are shaped as shown in the figures. To this the movable plate F is attached by means of the pivots G, so that the plate F and its arms connecting with the pivots G can be moved around the pivots G of the said movable plate F into the positions shown in dotted lines in Fig. 1. The shafts H have attached to their rear ends the metallic straps I in Figs. 1 and 3, which are formed with the flat portion J, and from the under side of this flat portion J there projects the cylindrical plug K. (See more particularly Figs. 1 and 3.) This cylindrical button K is passed into and engages with the double countersunk hole L in the front portion of the strap B, and when placed therein the plate F is forced down upon the flat portion J, and thus keeps the cylindrical plug K with its shaft H connected to the under strap B.

By reason of the movable plate F being connected to the spiral spring N within the spring-box O by the engagement of the ring P with the hook Q, formed on the upper part of the plate, and the other hook, Q', on the end of the rod R, which passes within the spring N, the tension of the spring N pulls the plate F with any required degree of pressure upon the flat portion J of the shaft or pole connections, and thus maintains them in working attachment with the carriage or other vehicle.

The front portion of the flat plate F is provided with the loop S, and by inserting a hook or rod in the hole in this the plate F may be pulled or lifted upward on its pivots G, as shown in Fig. 1, and this releasing of contact of the plate F with the flat portion J of the shaft or pole connections enables the shafts or pole to be instantly removed or replaced one by the other.

For the purpose of enabling the plate F to bear elastically upon the shaft or pole connections, and to enable the pole connections to rest elastically upon the front portion of the strap B, the bearing portions of the strap B, as well as the plate F, may have a layer of leather or other suitable elastic matter attached to them in order to prevent metallic contact and the rattling noise due to the shaking of parts in metallic contact, thereby rendering the employment of antirattlers as hitherto used unnecessary, but this is not absolutely essential.

I desire to explain that although I have in the preceding part of this specification described and in the annexed drawings shown the cylindrical plug K such plug is not necessarily cylindrical, although I believe it to be the best shape to adopt for the purpose of carrying out my invention in practice. It may, however, be formed with a circular or with a rectangular groove or hookwise. Although I have on the annexed drawings shown my connecting device as applied to a solid iron shaft, yet I desire it to be understood that the same may be applied to a shaft in which the upper part is made of wood, such as is commonly used in buggies and other kinds of light-weight road-carriages.

Having now described the nature of my invention and the best system, mode, and manner which I am at present acquainted with for carrying the same into practical effect, I desire to observe, in conclusion, that what I consider to be novel and original, and therefore claim as the invention to be secured to me by Letters Patent, is as follows:

1. The device, for enabling the shafts or pole to be connected with, or disconnected from, the front axle of the carriage, or other vehicle drawn by horses, consisting of a flat plate attached by bolts to a strap passing round the under portion and the two vertical sides of the front axle of such vehicle, having horizontal portions, one projecting rearward, the other forward, and to which that portion of the coupling device, attached to said axle, is fastened by the aforesaid bolts, a plate movable radially on pivots, and connected by means of the link to a spiral spring, contained within a box, at the rear part of the apparatus, said plate having a projection with a hole therein at its upper part, the spiral spring causing said movable plate to press upon the flat portion of the connecting-piece, attached to the shafts, or cross-tail of the pole, the cylindrical plugs projecting from the under sides of the flat pieces on the shafts or pole, and each of which plugs passes into a hole in the front portions of the straps, all operating together in the manner and for the purposes, substantially as set forth.

2. The coupling for connecting the shafts or pole to the front axle of the vehicle, carriage, or other road or street vehicle, consisting of the cylindrical plugs, each of which forms the rear terminal of the shaft or cross-tail of the pole, the corresponding holes in the strap attached to the axle, the movable pivoted plate, for pressing and maintaining the cylindrical plugs in their place in the aforesaid holes, the spiral spring, the connections of the spiral spring to the movable plate, the upward projection, with the hole therein on the upper part of the movable plate, all operating together in the manner and for the purposes, substantially as set forth.

In witness whereof I have hereunto set my signature in presence of two subscribing witnesses.

CHARLES WESLEY FILKINS.

Witnesses:
H. S. ROLLINS,
ST. JOHN DAY.